(12) United States Patent
Emery et al.

(10) Patent No.: US 8,244,604 B1
(45) Date of Patent: *Aug. 14, 2012

(54) METHOD AND APPARATUS FOR INVENTORY SEARCHING

(75) Inventors: Grant M. Emery, Austin, TX (US); Arpan Shah, Seattle, WA (US)

(73) Assignee: Versata Development Group, Inc., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/749,803

(22) Filed: Mar. 30, 2010

Related U.S. Application Data

(63) Continuation of application No. 10/146,178, filed on May 15, 2002, now Pat. No. 7,756,759.

(51) Int. Cl.
*G06Q 10/00* (2012.01)
*G06Q 30/00* (2012.01)

(52) U.S. Cl. ............ 705/28; 705/1.1; 705/26.5

(58) Field of Classification Search .............. None
See application file for complete search history.

(56) References Cited

U.S. PATENT DOCUMENTS

| | | | |
|---|---|---|---|
| 4,811,199 A | 3/1989 | Kuechler et al. | |
| 5,515,524 A | 5/1996 | Lynch | |
| 5,778,362 A | 7/1998 | Deerwester | |
| 5,825,651 A | 10/1998 | Gupta et al. | |
| 6,002,854 A | 12/1999 | Lynch | |
| 6,341,282 B1 | 1/2002 | Sharpe et al. | |
| 6,377,937 B1 | 4/2002 | Paskowitz | |
| 6,397,212 B1 | 5/2002 | Biffar | |
| 6,405,308 B1 | 6/2002 | Gupta et al. | |
| 6,519,588 B1 | 2/2003 | Leschner | |
| 6,604,107 B1 | 8/2003 | Wang | |
| 6,675,294 B1 | 1/2004 | Gupta et al. | |
| 6,708,161 B2 | 3/2004 | Tenorio et al. | |
| 6,778,993 B2 | 8/2004 | Wang | |
| 6,789,252 B1 | 9/2004 | Burke et al. | |
| 6,901,430 B1 | 5/2005 | Smith | |
| 6,917,941 B2 | 7/2005 | Wight et al. | |
| 6,961,731 B2 | 11/2005 | Holbrook | |
| 7,043,407 B2 | 5/2006 | Lynch et al. | |
| 7,103,605 B1 | 9/2006 | Hazi et al. | |
| 7,756,759 B1 * | 7/2010 | Emery et al. ............ | 705/28 |
| 2001/0034625 A1 | 10/2001 | Kwoh | |
| 2001/0050678 A1 | 12/2001 | Nishikubo et al. | |
| 2002/0004757 A1 | 1/2002 | Torres et al. | |
| 2002/0087408 A1 | 7/2002 | Burnett | |
| 2002/0161671 A1 | 10/2002 | Matsui et al. | |
| 2003/0046179 A1 | 3/2003 | Anabtawi et al. | |

* cited by examiner

*Primary Examiner* — Asfand Sheikh

(74) *Attorney, Agent, or Firm* — Hamilton & Terrile, LLP; Kent B. Chambers

(57) ABSTRACT

A method is disclosed that includes identifying an inventory item corresponding to a product configuration. The product configuration is defined using a feature map. The inventory item is also defined using the feature map. Each entry of the feature map corresponds to one of a number of features of a product.

24 Claims, 11 Drawing Sheets

| Feature Map Position: | 7 | 6 | 5 | 4 | 3 | 2 | 1 | 0 |
|---|---|---|---|---|---|---|---|---|
| Characteristic Assignments: | Exterior Color | | | | Radio | | Air Conditioning | |
| Feature Assignments: | Red | Green | Blue | Deluxe Radio | Standard Radio | No Radio | Installed A/C | No A/C |

FIG. 2

|  | Exterior Color | | Radio | | | A/C | | |
| --- | --- | --- | --- | --- | --- | --- | --- | --- |
|  | Red | Green | Blue | Deluxe | Standard | No | Yes | No | |
| Assembly Stage 1 | 1 | 1 | 1 | 1 | 1 | 1 | 1 | 1 | Can be painted green, red, or blue; radio type not yet determined; A/C not yet determined |
| Assembly Stage 2 | 1 | 0 | 1 | 1 | 1 | 1 | 1 | 1 | Will be painted red or blue; radio type not yet determined; A/C not yet determined. |
| Assembly Stage 3 | 1 | 0 | 1 | 1 | 0 | 0 | 0 | 1 | Will be painted red or blue; deluxe radio installed; no A/C to be installed |
| Finished Automobile | 1 | 0 | 0 | 1 | 0 | 0 | 0 | 1 | Painted red; deluxe radio installed; no A/C to be installed |

FIG. 3

| User-Preference List | Exterior Color | | | Radio | | | A/C | | Can may be red or green; deluxe radio; A/C installed |
|---|---|---|---|---|---|---|---|---|---|
| | Red | Green | Blue | Deluxe | Standard | No | Yes | No | |
| | 0 | 1 | 1 | 1 | 0 | 0 | 1 | 0 | |

Fig. 4

|  | Exterior Color | Radio | A/C | |
|---|---|---|---|---|
| User-Preference List | 0 | 1 | 1 | 0 | 0 | 1 | 0 | Can may be red or green; deluxe radio; A/C |

Matches

|  | Exterior Color | Radio | A/C | |
|---|---|---|---|---|
| Assembly Stage 1 | 1 | 1 | 1 | 1 | 1 | 1 | 1 | Can be painted green, red, or blue; radio type not yet determined; A/C not yet determined |
| Assembly Stage 2 | 1 | 0 | 1 | 1 | 1 | 1 | 1 | Will be painted red or blue; radio type not yet determined; A/C not yet determined |

Non-Matches

|  | Exterior Color | Radio | A/C | |
|---|---|---|---|---|
| Assembly Stage 3 | 1 | 0 | 1 | 0 | 0 | 0 | 1 | Will be painted red or blue; deluxe radio installed; no A/C to be installed |
| Finished Automobile | 1 | 0 | 0 | 0 | 0 | 0 | 1 | Painted red; deluxe radio installed; no A/C to be installed |

FIG. 5

| Array Index | CID number | CID numerical value | |
|---|---|---|---|
| | | Binary | decimal |
| 0 | CID 3 | 00111111 | 63 |
| 1 | CID 1 | 01000101 | 69 |
| 2 | CID 2 | 10001010 | 138 |
| 3 | CID 4 | 10110010 | 178 |

FIG. 6

| User-Preference CID | Exterior Color | | Radio | | A/C | | |
|---|---|---|---|---|---|---|---|
| | Red | Green | Blue | Deluxe | Standard | No | Yes | No |
| | 0 | 0 | 1 | 1 | 0 | 0 | 1 | 0 |

| | Red | Green | Blue | Deluxe | Standard | No | Yes | No | |
|---|---|---|---|---|---|---|---|---|---|
| CID 3 | 0 | 0 | 1 | 1 | 1 | 1 | 1 | 1 | Distance = 3 |
| CID 1 | 0 | 1 | 0 | 0 | 0 | 1 | 0 | 1 | Distance = 0 |
| CID 2 | 1 | 0 | 0 | 0 | 1 | 0 | 1 | 0 | Distance = 1 |
| CID 4 | 1 | 0 | 1 | 1 | 0 | 0 | 1 | 0 | Distance = 3 |

FIG. 7

| User-Preference CID | Exterior Color Weight = 25 | | Radio Weight = 15 | | A/C Weight = 5 | |
|---|---|---|---|---|---|---|
| | Red | Green | Blue | Deluxe | Standard | No | Yes | No |
| | 0 | 0 | 1 | 1 | 0 | 1 | 0 |

| | | | | | | | | |
|---|---|---|---|---|---|---|---|---|
| CID 3 | 0 | 0 | 1 | 1 | 1 | 1 | 1 | Total = 45 |
| CID 1 | 0 | 1 | 0 | 0 | 0 | 1 | 0 | Total = 0 |
| CID 2 | 1 | 0 | 0 | 0 | 1 | 0 | 1 | Total = 5 |
| CID 4 | 1 | 0 | 1 | 1 | 0 | 1 | 0 | Total = 45 |

Fig. 8

|  | Exterior Color Weight = 25 | | Radio Weight = 15 | | | A/C Weight = 5 | | |
| --- | --- | --- | --- | --- | --- | --- | --- | --- |
|  | Red | Green | Blue | Deluxe | Standard | No | Yes | No |
| User-Preference CID | 0 | 0 | 1 | 1 | 0 | 0 | 1 | 0 |
| Filter | 1 | 1 | 1 | 1 | 1 | 0 | 1 | 0 | There must be A/C and a radio |

Passes Filter

| CID 3 | 0 | 0 | 1 | 1 | 1 | 1 | 1 | 0 |
| --- | --- | --- | --- | --- | --- | --- | --- | --- |
| CID 4 | 1 | 0 | 1 | 1 | 0 | 0 | 1 | 0 |
| CID 2 | 1 | 0 | 0 | 0 | 1 | 0 | 1 | 0 |

Does not pass filter

| CID 1 | 0 | 1 | 0 | 0 | 0 | 1 | 0 | 1 |
| --- | --- | --- | --- | --- | --- | --- | --- | --- |

Fig. 9

METHOD AND APPARATUS FOR INVENTORY SEARCHING

This application is a continuation of application Ser. No. 10/146,178, filed May 15, 2002 now U.S. Pat. No. 7,756,759, which is incorporated herein by reference in its entirety.

BACKGROUND OF THE INVENTION

1. Field of the Invention

The present invention relates to searching inventory databases, and more specifically, relates to a method and apparatus for inventory searching that employs a novel inventory representation and manipulation system.

2. Description of the Related Art

It is a common problem in many retail software applications (such as websites) to locate an item in a vendor's available stock that is as similar as possible to an item a customer wants. Currently, in most cases, this problem is solved by having all the information on the item in stock stored in a database. To search for items, the software queries the database to get a list of in-stock items that possess the desired characteristics. Generally, the software then post-processes the result set in some way, generally resorting and filtering the results based on various criteria.

While this solution is very general, it does not scale well over large data sets. This is because the typical database is so general that it is difficult to easily exploit much of the information that is implicitly available in such a database. For example, such implicit information can be the result of the information being inventory information. As a general rule, it is difficult to perform real-time inventory searches using only a database system because such systems are typically too slow to provide the information in a timely manner.

What is therefore needed is a system and method for performing rapid searches of inventory databases. Preferably, such a system and method would employ, at least in part, information implicit in the database information.

SUMMARY OF THE INVENTION

In one embodiment, a method is disclosed. The method includes identifying an inventory item corresponding to a product configuration. The product configuration is defined using a feature map. The inventory item is also defined using the feature map. Each entry of the feature map corresponds to one of a number of features of a product.

In another embodiment, method for manipulating inventory information is disclosed. The method includes constructing a user-preference list using a feature map. Each entry of the feature map corresponds to one of a number of features of a product. The value of each entry in the user-preference list indicates a desired presence of a corresponding one of the features.

In still another embodiment, method for manipulating inventory information is disclosed. The method includes constructing an inventory item list using a feature map. Each entry of the feature map corresponds to one of a number of features of the product. The inventory item list corresponds to an inventory item. The inventory item is a configuration of a product. The value of each entry in the inventory item list corresponds to a presence of one of the features in the product.

In yet another embodiment, method for manipulating inventory information is disclosed. The method includes translating data from a database into an inventory item list using a feature map. Each entry of the feature map corresponds to one of a number of features of a product. The value of each entry in the user-preference list indicates a desired presence of a corresponding one of the features.

The foregoing is a summary and thus contains, by necessity, simplifications, generalizations and omissions of detail; consequently, those skilled in the art will appreciate that the summary is illustrative only and is not intended to be in any way limiting. As will also be apparent to one of skill in the art, the operations disclosed herein may be implemented in a number of ways, and such changes and modifications may be made without departing from this invention and its broader aspects. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

FIG. 2 is a diagram depicting a feature map.

FIG. 3 is a diagram depicting a category identifier (CID).

FIG. 4 is a diagram depicting a user-preference list.

FIG. 5 is a diagram depicting a user-preference CID and four inventory item CIDs.

FIG. 6 is a diagram depicting CIDs after sorting and array index assignment.

FIG. 7 is a diagram depicting the scores of four inventory item CIDs from a user-preference CID.

FIG. 8 is a diagram depicting the scores of four inventory item CIDs from a user-preference CID.

FIG. 9 is a diagram depicting a filter.

DETAILED DESCRIPTION

The following sets forth a detailed description of a mode for carrying out the invention. The description is intended to be illustrative of the invention and should not be taken to be limiting.

Introduction

An inventory representation and searching system according to embodiments of the present invention is described herein that provides fast, efficient searching of an inventory database, while also providing efficient use of resources (e.g., system throughput and memory). Moreover, such an inventory representation and searching system allows for single features to have multiple values. Traditionally, database inventory systems have suffered from the restriction that each feature being searched on can have only a single value, because that value is represented in the database as a datatype known as a "string" datatype (consisting of a number of characters), typically corresponding to a certain part number. An embodiment of the present invention provides a choice of having each feature (e.g., a database column) associated with a set of a values. This allows for a flexible inventory representation and searching system. Moreover, implementations according to embodiments of the present invention that employ bit vectors afford additional advantages, such as improved performance and memory compactness.

Many embodiments of the present invention have application to a wide range of industries including the following: computer hardware and software manufacturing and sales, professional services, financial services, automotive sales and manufacturing, telecommunications sales and manufacturing, medical and pharmaceutical sales and manufacturing, and construction industries. For example, in the automotive industry, embodiments of the inventory search engine can be used to provide automobile dealer and/or manufacturer inventory information to a user. The inventory information can be especially useful when used in conjunction with the configuration of a product where inventory data is available. One example of an industry that generally maintains real-time or near real-time inventory data is the automotive industry. For example, after a user has completely or partially configured an automobile, embodiments of the inventory search engine can locate automobiles in inventory, using inventory data, that corresponds to (i.e., matches or matches within certain guidelines) the user's configured automobile. With this information, the user can locate a dealer having a desired automobile in inventory and the dealer's potential customer base increases, thereby increasing the likelihood of a quicker sale and reducing costs associated with maintaining inventory.

An Inventory Search Architecture According to the Present Invention

Figure 1:
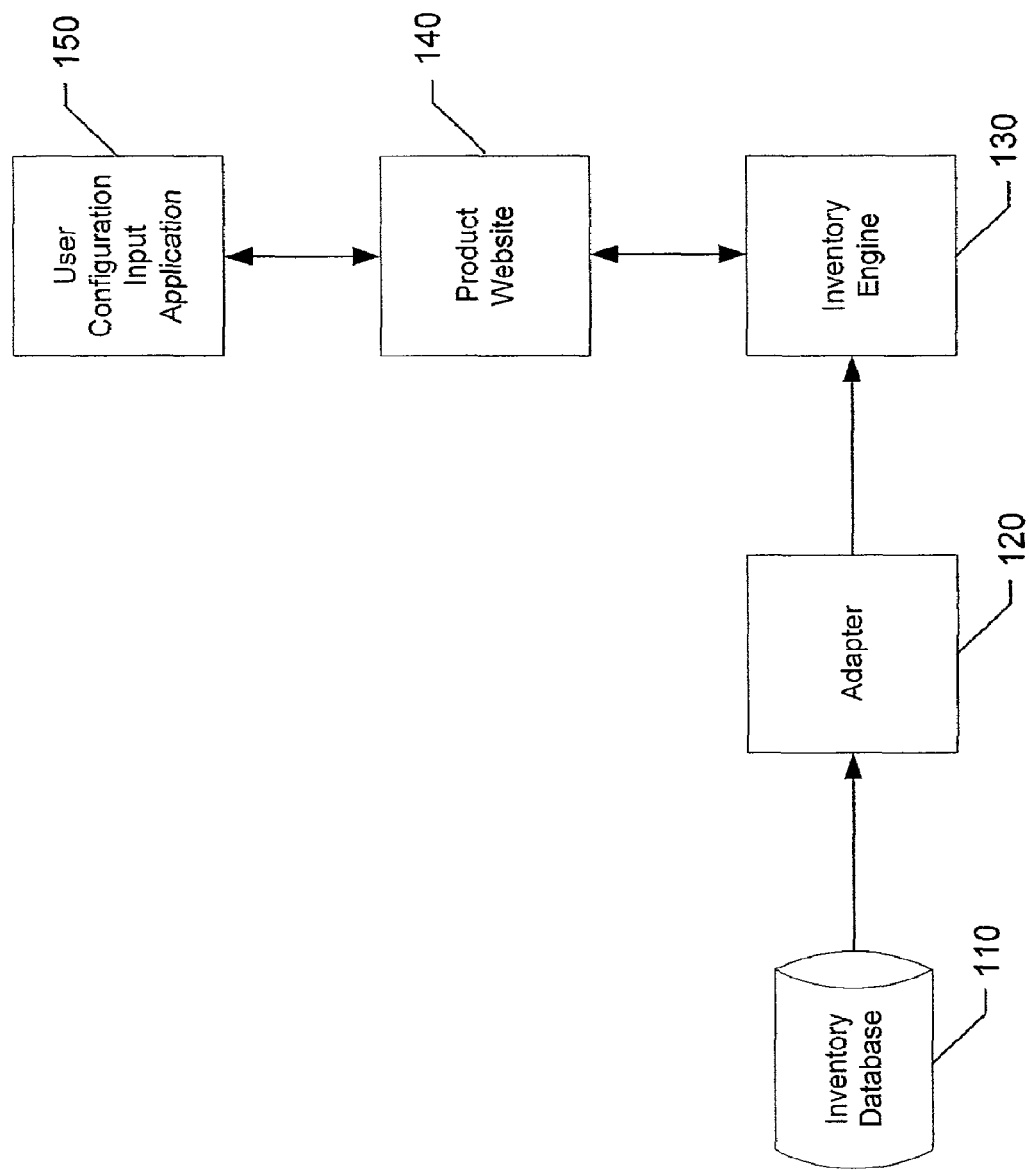
FIG. 1 is a block diagram depicting an inventory search architecture.

FIG. 1 is a block diagram depicting one embodiment of the present invention. In this embodiment, inventory database 110 comprises information about individual items in an inventory (i.e., inventory items), stored such that the information is capable of being manipulated by computer. Inventory database 110 is operably coupled to adapter 120. Adapter 120 is operably coupled to inventory engine 130. Inventory engine 130 performs a number of functions described in more detail in connection with other Figures below.

In the embodiment depicted, inventory engine 130 is operably coupled to product retail website 140. Product website 140 is a website maintained for the purpose of giving customers and potential customers electronic access to the products of one or more businesses. Each of these products has certain features. Each inventory item is a configuration of one of these products (i.e., each inventory item is in a product line, and possesses some or all of the given product's features). Product website 140 is operably connected to user configuration input application (herein also "user application") 150. User application 150 provides users, including customers and potential customers, a tool with which to consider preferences among product configurations, to choose among those preferences, and to communicate those preferences to product website 140 and inventory engine 130.

In the embodiment depicted in FIG. 1, category IDs ("CIDs") are used to represent configurations of a given products (i.e., products within a product line). A CID is a list of entries in which each entry specifies the presence of features available for the products in the product line, and where a potential customer ("customer" or "user" herein) can express preferences for those features. One or more features correspond to a characteristic of a given product. A given feature may or may not be present in any given inventory item corresponding to the product, and so each CID entry indicates the presence or absence of such features.

Taking an automobile as an example, features could include each of the available paint colors (e.g., red, green and blue); each of the available radio options (e.g., deluxe, standard, and none); and each of the available air conditioning options (installed and none). The CID does not need to represent options for which the user cannot directly express preferences, such as standard automobile parts, because the presence of these options must necessarily be completely determined by the list of parts that the user has selected directly by selecting a product for which to begin the feature preference process.

In this embodiment, a CID is used to store individual feature information by assigning a single bit to each entry representing the a preference for the presence or absence of a feature option. Continuing the automobile example begun above, the exterior color features, comprising the colors of red, green, and blue, are assigned three bit positions, one for each entry for red, green, and blue. The radio features are assigned three bit positions, one for deluxe, one for standard, and one for no radio. The air conditioning features are assigned two bit positions, one for air conditioning being installed, and one for air conditioning not installed.

In one embodiment, a feature map is a construct that is one logical level removed from the CID. A feature map contains the entire context necessary to determine the product configuration that a given CID represents. Only one feature map is required for a given product line, and that one feature map can be used with all CIDs for that product line. The information represented by a feature map is stored independently from the individual CIDs for a product line to conserve memory when storing large amounts of inventory information.

Referring again to FIG. 1, adapter 120 serves to translate the raw data in inventory database 110 into the CID form used by inventory engine 130 to perform searches. Adapter 120 can be conceptualized as a compilation step or the like. For example, inventory database 110 might contain one row for every inventory item (e.g., vehicle) in inventory. Adapter 120 examines each row in turn, using the corresponding feature map from inventory engine 130 to determine which columns in that row corresponded to features of the vehicle that are to be exposed for searching, and uses the values in each of those columns to assemble the bit vector CID representation of the vehicle. The resulting CID can then be stored in memory or saved to disk to be retrieved later by inventory engine 130 when the user wishes to perform a search. In certain embodiments, the exact structure of adapter 120 is determined, at least in part, by the structure of the inventory database(s) (e.g., inventory database 110) upon which adapter 120 operates. Thus, adapter 120 can be configured, for example, to read data from multiple databases, multiple tables in a given database, or whatever is required to access the requisite inventory information in the form and configuration in which that information exists. Thus, the structure and capabilities of adapter 120 provide a flexible approach to the searching of one or more inventory databases.

FIG. 2 is a diagram depicting a feature map according to one embodiment of the present invention. The feature map depicted in FIG. 2 is a feature map for a product line. This feature map is constructed by determining which characteristics of the product a user is to be able to express a preference (e.g., exterior color, radio, and air conditioning, but not engine size or seat type). After such characteristics are determined, features are associated with that characteristic, along with possible entries for each feature. The features are then assigned positions in the CID. In the CID of FIG. 3, the characteristic "air conditioning" has been assigned to positions 0 and 1, and within those positions, "no air conditioning" has been assigned to position 0 and "installed air conditioning" has been assigned to position 1. In the same CID, the characteristic "radio" has been assigned to positions 2, 3, and 4, and within those positions, "no radio" has been assigned to position 2, "standard radio" has been assigned to position 3, and "deluxe radio" has been assigned to position 4. In the same CID, the characteristic "exterior color" has been assigned to positions 5, 6, and 7, and within those positions, "blue" has been assigned to position 5, "green" has been assigned to position 6, and "red" has been assigned to position 7. In this embodiment, for all positions in the feature map, the possible entries are a "1" bit for user preference for a feature (in a user-preference CID) or the presence of a feature in an inventory item (in an inventory item CID), and a "0" bit otherwise. Generally, the order and placement of characteristics in a list is not important, except that in a preferred embodiment, characteristics should not be assigned positions across word boundaries in computer memory because such assignment would require an extra memory reference to retrieve the value of that characteristic.

In one embodiment, once a feature map has been created for a product line, data about the individual items on the assembly line and in inventory can be imported from any source, generally a database such as inventory database 110 of FIG. 1. Such importation generally involves taking each database row, examining the values of each characteristic in the feature map, and making corresponding entries in an inventory item list for each item in inventory. In one embodiment such as the embodiment discussed in connection with FIGS. 3, 4, and 5, making entries in inventory item lists is accomplished by setting bits in a OD for each item in inventory.

This embodiment allows a OD the flexibility to represent an automobile that is still on the assembly line, while the presence of some or all of the features have not yet been determined. One use of this flexibility is that a user may specify preferences and those preferences may be built in to a specific auto on the assembly line. Herein, the term "inventory item" and like terms includes but is not limited to items in assembly or production (e.g., automobiles on an assembly line) and finished items.

FIG. 3 is a diagram depicting a CID according to one embodiment of the present invention, and demonstrates the flexibility provided by the use of such a CD as outlined above. At Assembly Stage 1, the specific automobile represented by the OD, here an inventory item list, will be painted either red, green, or blue, but has not yet been painted. The entry for each of those features is the bit "1", denoting that each of those features is available to a user. Likewise, either a deluxe or a standard radio can be stalled, but has not yet been installed; or no radio may be installed. Finally, an air conditioner has not been installed, and either an air conditioner may or may not be installed.

Referring further to FIG. 3, at Assembly Stage 2, green has been excluded as an exterior color option, and the entry for green as an exterior color is the bit "0". All of the other features remain as described with respect to Assembly Stage 1. At Assembly Stage 3, a deluxe radio has been installed. The entry for a deluxe radio remains the bit "1" while the entries for a standard radio and no radio are now the bit "0". A decision has been made not to install air conditioning; the entry for air conditioning is now the bit "0" and the entry for no air conditioning is the bit "1". The exterior color features remain as described with respect to Assembly Stage 2. The Finished Automobile has been painted red, so the entry for red as an exterior color remains the bit "1" while the entry for green and blue are now both "0". The entries for the radio and air conditioning features remain as described with respect to Assembly Stage 3.

FIG. 4 is a diagram depicting a user-preference list according to one embodiment of the present invention. In the user-preference list depicted in FIG. 4, the user has a preference for either a green or a blue, but not a red, exterior color. The entry for a red exterior color here is the bit "0", and for green and blue, the bit "1". The user prefers a deluxe radio, so the entry in the user-preference list for a deluxe radio is the bit "1" and for a standard radio and for no radio, the bit "0". The user also prefers air conditioning, so the entry for air conditioning is the bit "1" and for no air conditioning, the bit "0".

FIG. 5 is a diagram depicting a user-preference CID along with four inventory item CIDs. In one embodiment, matches for the user-preference list within the set of inventory item lists are determined by performing a bitwise AND operation on the user-preference list and each of the inventory item lists. If the result of a given bitwise AND operation matches the inventory item list, the inventory item list upon which the bitwise AND operation was performed is a match. This assumes that either the inventory is known to contain no partial configurations, or the user is not allowed to select more than one option for a given characteristic. Use of a bitwise AND operation, rather than seeking exactly equal inventory item lists, identifies matches among the set of inventory item lists that include inventory item matching more than one user preference among the features of a characteristic, e.g., a preference for red or green would be matched by inventory items that are red and inventory items that are green.

Referring now to FIG. 5, the user-preference CID of FIG. 4 is again depicted, along with matches and non-matches among the set of four CIDs of FIG. 3, representing inventory item lists, i.e., list that represent automobiles on the assembly line or in inventory as finished automobiles. The inventory item list of Assembly Stage 1 is a match to the user-preference list because every user preference denoted by entries of "1" is matched by and entry of "1" in the inventory item list of Assembly Stage 1.

Referring further to FIG. 5, the inventory item list of Assembly Stage 2 also matches the user preference list. Here, however, not every user preference corresponding to a "1" entry is matched in the inventory item list of Assembly Stage 2. The match exists because at least one of the user's exterior color preferences (here, blue) is matched by the Assembly Stage 2 inventory item list; the user's radio preference is matched, and the user's air conditioning preference is matched.

Referring further to FIG. 5, the inventory item list of Assembly Stage 3 does not match the user preference list. The Assembly Stage 3 inventory item list contains a "1" entry for no air conditioning, whereas the user preference list contains a "0" for air conditioning. The Finished Automobile inventory item does not match the user preference list for that reason, and because the only "1" entry for an exterior color is for red, which does not match either of the user's exterior color preferences. When a characteristic such as "exterior color" or "radio" has at least two possible preferences (such as green and blue from among red, green, and blue for "exterior color", as in the user preference list of FIGS. 3 and 4), a CID that includes entries corresponding to those multiple preferences for a characteristic is called a "partial configuration".

In an embodiment such as the one discussed above in reference to FIGS. 3, 4, and 5, any entry that corresponds to the absence of the characteristic altogether, such as "no radio" or "no air conditioning" should have the lowest numerical value within the CID. Referring to the user preference list of FIGS. 3, 4, and 5, "no radio", for instance, with no other preference express with regard to a radio, is represented by the entries "001". "No air conditioning is represented by the entries "01". Rather than searching beginning at the first array element, a binary search is used to attempt to locate an inventory item list in the array that is identical to the user-preference list. This is the only search required if it is known that there are no partial configurations among the inventory item lists in the array. If partial configurations are known to exist and the binary search identifies no inventory item lists that are identical to the user-preference list, a linear search is begun from the location in the array indicated by the binary search. (Since any inventory item list that is identical to the user-preference list must have, at least, all the same "1" bits, any partial configuration among the inventory term lists must be numerically greater than the user preference list, so a linear search can start at the location indicated by the binary search.) This optimization strategy allows the elimination of half of the array, on average, from consideration when searching for partial configuration matches among the inventory item lists. In one embodiment, each OD, once created, is stored in an array for future searches. After all the CIDs are created for an inventory of a product line, the array is sorted in numerical order. FIG. 6 depicts four CIDs so sorted.

FIG. 6 is a diagram depicting the CIDs after being numerically sorted and then having an array index assigned. Among the four CIDs depicted in FIG. 6, CID 3, with a value of 001111111 (binary), or 63 (decimal), is the lowest CID in numerical value and has Array Index=0. Using the feature map discussed in connection the embodiment depicted in FIGS. 3, 4, and 5, CID 3=00111111 represents a blue car with any radio feature (including no radio) and either air conditioning option (installed or no air conditioning).

Referring further to FIG. 6, CID 1=01000101 has the second lowest numerical value and Array Index=1. Using the feature map discussed in connection the embodiment depicted in FIGS. 3, 4, and 5, CID 1=01000101 represents a green car with no radio and no air conditioning. CID 2=10001010 has the third lowest numerical value and an Array Index=2. Using the feature map discussed in connection the embodiment depicted in FIGS. 3, 4, and 5, CID 2=10001010 represents a red car with a standard radio and installed air conditioning. CID 4=10110010 has the highest numerical value and Array Index=3. Using the feature map discussed in connection the embodiment depicted in FIGS. 3, 4, and 5, CID 4=10110010 represents a red or blue car with a deluxe radio and installed air conditioning. In one embodiment, the array is written out to disk so that the application performing the search can retrieve it directly, thus saving time, because the import process can be time-consuming.

It is sometimes desirable to produce a list of alternate choices available in inventory that are similar to the user-preferred configuration as expressed in a user-preference list. In one embodiment, for a given inventory item list, the number of features that match the user-preference list is counted by counting the number of "1" bits in the result of the bitwise AND operation on the user-preference list and the inventory item list. The number of matching "1" bits for each inventory item list is used as a distance metric to express the "distance" between the user-preference list and each inventory item list. Alternatively, given that a higher numerical value for the number is matching "1" bits indicates a better match, this distance metric can also be referred to as a score, which is more intuitively logical. This distance-determination algorithm can be used to evaluate an entire inventory very quickly using a bit-counting algorithm, which, in pseudocode (where the "AND" operation is a bitwise AND), can be written as:

Function countbits(Integer n)
        Integer count=0
        while n !=0 do
            count=count+1
            n=n AND (n−1)
        end
        return count It should be noted that the fast bit-counting distance and equality-test-for-matching techniques described in the preceding passages are optimizations that are appropriate for cases where either the inventory (the inventory list) contains no partial configurations, or the user is not allowed to search with a preference CID that allows for more than one option for each characteristic. This is because, in order for there to be a match for a single characteristic, there need only be overlap in the user-preference list and the inventory item for that characteristic. Thus, for example, the situation in which a user-preference list is "110" and the inventory item is "101" should be considered a match, because there is a potential non-partial configuration for that inventory item which matches the user preference (namely, "100"). The entire configuration matches if and only if every characteristic matches. Thus, the previous techniques will operate properly if it is known that the user-preference list will only contain a single "1" bit in each characteristic, either because that is the only possible result (the inventory list contains no partial configurations) or the user is not allowed to perform such a query (the user is not allowed to search with a preference CID that allows for more than one option for each characteristic).

Alternatively, a full-weighting or full-matching technique can be used to generate an accurate distance or match, respectively, if partial configurations are possible or the user is allowed to search with a preference CID that allows for more than one option for each characteristic. This can be accomplished by crafting the analysis to take into account that there may be more than one match possible for any given characteristic. However, because such full-weighting or full matching techniques take this possibility into account, such techniques tend to be relatively slower in producing results than the fast bit-counting distance and equality-test-for-matching techniques presented previously.

The flexibility of such techniques is thus evident from the preceding figures. With regard to FIGS. 5 and 6, inventory items that match the desired configuration or item(s) can be identified using such techniques. Such approaches can be adapted to a situation in which inventory items that simply correspond to certain features of the desired configuration or item(s). In other words inventory items that correspond to a desired configuration or item need not match that configuration or item exactly. This can be accomplished by using the techniques described herein to "filter out" inventory that does not have at least some subset of the configured features or features that are predetermined (or user selected) to be equivalents or near equivalents to the configured features. This could be accomplished by taking the result of ANDing together the bits of the result of the bitwise AND operation, which would detect a match in any one of the pertinent features. In such a case, a result that constitutes a "match" can be defined by a non-zero result, for example. Thus, identifying inventory items that correspond to a desired configuration or item is possible.

FIG. 7 is a diagram depicting the scores of four inventory item CIDs from a user-preference CID. A bitwise AND operation performed on the user preference CID depicted and each of the inventory item CIDs 3, 1, 2, and 4 from FIG. 6 results in scores of 3, 0, 1, and 3, respectively. The higher scores denote comparatively better matches.

In one embodiment, a list of alternate choices is produced by assigning a weight to each feature, and then the closeness of the match is determined by the sum of the weights of all features whose values in both the user-preference list and a given inventory item list are the same. The result of each bitwise AND operation on the user-preference list and an inventory item list is examined using the feature map: each "1" bit in the result, denoting a match between a specific feature in the user-preference list and an inventory item list, is interpreted according to a characteristic of the feature map and the weight of that feature is added to a running total for that inventory item list.

FIG. 8 is a diagram depicting the distance measures (scores) of four inventory item CIDs from a user-preference CID. Here, the characteristic "exterior color" has been assigned a weight of 25, "radio" a weight of 15, and "air conditioning" a weight of 5, denoting the relative importance of each of the characteristics to a user. A bitwise AND operation performed on the user preference CID depicted and each of the inventory item CIDs 3, 1, 2, and 4 from FIG. 6 results in scores of 45, 0, 5, and 45, respectively. The higher scores denote comparatively better matches.

In comparing the bit-counting algorithm and the weighting algorithm, it will be apparent to one of skill in the art that each of these algorithms provides its own advantages. In making such a comparison, it can be seen that the bit-counting algorithm is capable of providing results more quickly than the weighting algorithm. However, the weighting algorithm provides more flexibility than the bit-counting algorithm, allowing for the consideration of each feature's importance to a user.

In one embodiment, the inventory engine can be used to filter out inventory item lists in which the user has no interest or which a vendor wants to exclude from availability. In one embodiment, this filtering operation is performed using a filter list. The filter list contains entries that fulfil the requirements of the particular filtering operation for which it is required.

In one embodiment using the bit entries as described in connection with FIGS. 3, 4, and 5, for the purpose of filtering out inventory items in which the user is not interested, the filter list contains entries of "1" bits for of the features in which she is interested and "0" bits for the features in which she is not interested.

FIG. 9 is a diagram depicting a filter that reflects the exclusion of automobiles with no air conditioning and no radio with entries of "0" for the "no radio" and "no air" and entries of "1" for all other available features. Of the four CIDs from FIG. 6, CIDs 3, 2, and 4, pass the filter: all have air conditioning installed and either a deluxe or standard radio. CID 1 does not pass because CID 1 represents a selection that has neither air conditioning nor either type of radio. In one embodiment using the bit entries as described in connection with FIGS. 3, 4, and 5, for the purpose of filtering out inventory items that a vendor wants to exclude from availability, the filtering operates in a fashion similar to that described in connection with filtering out inventory items for a user.

In an embodiment in which partial configurations are allowed, as has been noted, a bitwise AND operation can be performed on the filter list and every inventory item list, and then each characteristic being analyzed for a non-zero result in one of the bit positions for that characteristic. An inventory item list satisfies the filter in a given characteristic if there is any overlap between the filter and the inventory item with regard to that characteristic. This allows for the case where there are multiple matches (here, ones) in the result for a given characteristic. With regard to the user-preference filter, satisfaction of the filter by a given inventory item list indicates that the user would be interested in the corresponding inventory item. With regard to the vendor availability filter, satisfaction of the filter by a given inventory item list indicates that the corresponding inventory item will be made available.

In another embodiment in which partial configurations are not allowed, the operation of such a system can be made more efficient by simply performing a bitwise AND operation on the filter list and every inventory item list. In this case, for each inventory item list, if the result equals the inventory item list, that inventory item list satisfies the filter. With regard to the user-preference filter, satisfaction of the filter by a given inventory item list indicates that the user would be interested in the corresponding inventory item. With regard to the vendor availability filter, satisfaction of the filter by a given inventory item list indicates that the corresponding inventory item will be made available. Because bitwise AND operations can be performed very rapidly, filtering using bitwise AND operations incurs little speed penalty for the additional utility provided. However, such a filter (i.e., a filter that filters with only a single "1" in each characteristic) effectively limits the system to only returning a single configuration (and partial configurations that could eventually result in that single configuration).

An Example Computing and Network Environment

Figure 10:
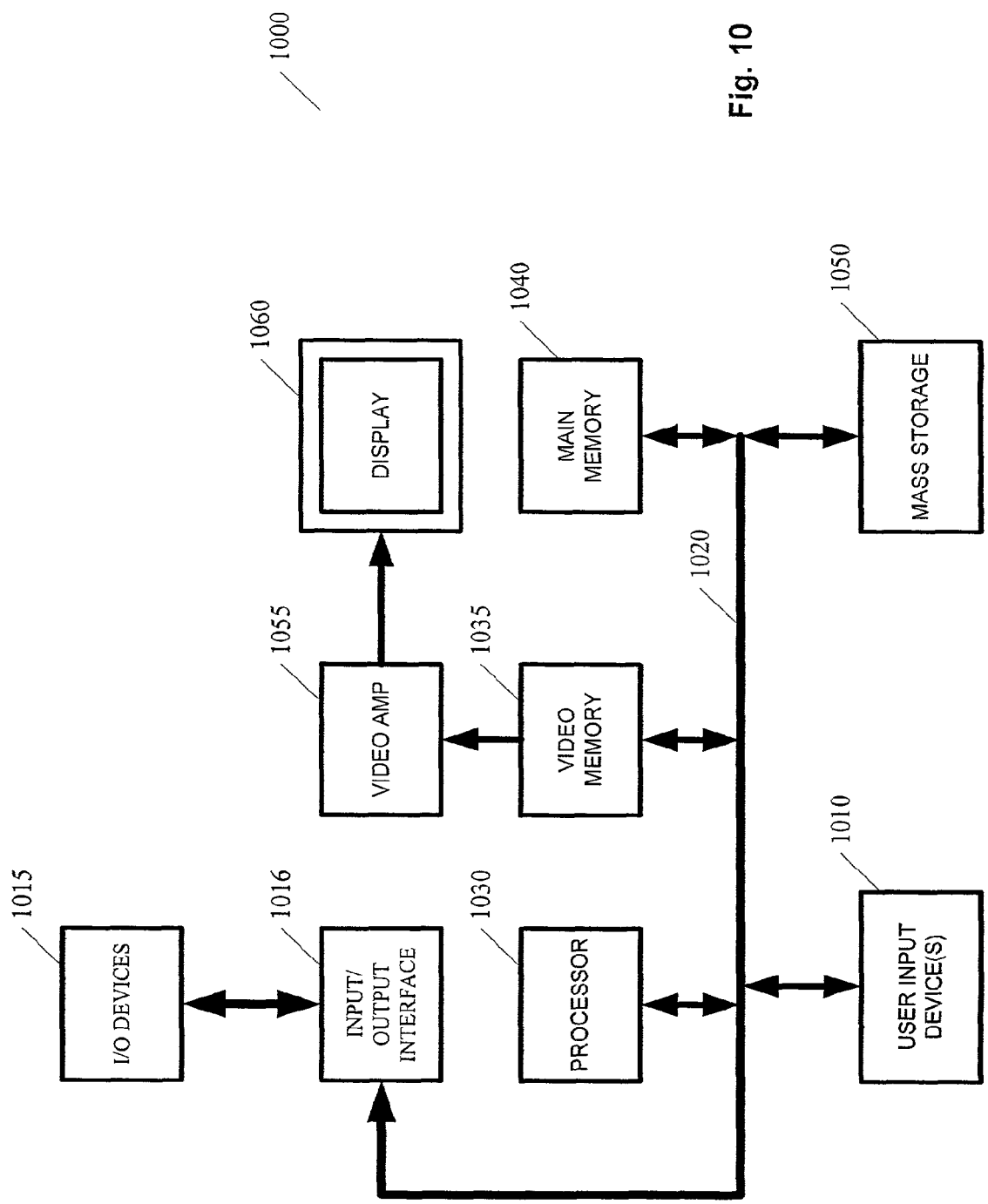
FIG. 10 is a block diagram illustrating a computer system suitable for implementing embodiments of the present invention.

FIG. 10 depicts a block diagram of a general-purpose computer 1000 suitable for implementing embodiments of the present invention, for example, clients and/or servers in a client/server architecture. General-purpose computer 1000 is typically a data processing system designed to provide computing power to one or more users, either locally or remotely. Input user device(s) 1010, such as a keyboard and/or mouse, as well as other input/output (I/O) devices 1015 (via I/O interface (I/F) 1016) are coupled to a bi-directional system bus 1020. The input user device(s) 1010 permit user input to the computer system and communicating that user input to processor 1030. General-purpose computer 1000 also includes a video memory 1035, a main memory 1040 and a mass storage unit 1050, all coupled to bi-directional system bus 1020 along with input user device(s) 1010 and processor 1030. Mass storage unit 1050 may include both fixed and removable media, such as floppy disk(s), hard disk(s), tape drive(s), CD-ROM drive(s), CD-RW drive(s) and the like. Bus 1020 may contain, for example, 1032 address lines for addressing video memory 1035, main memory 1040, controllers for mass storage unit 1050 and the like. System bus 1020 also includes, for example, a 32-bit data bus for transferring data between and among the components, such as mass storage unit 1050, processor 1030, video memory 1035 and main memory 1040. Alternatively, multiplex data/address lines may be used instead of separate data and address lines.

Computer programs and data are generally stored as instructions and data in mass storage unit 1050 until loaded into main memory 1040 for execution. Computer programs may also be in the form of electronic signals modulated in accordance with the computer program and data communication technology when transferred via a network. The method and functions relating to the present invention may be implemented in a computer program alone or in conjunction with combinations of hardware and software. Furthermore, context subsystem data structures can be implemented in and utilized by general-purpose computer 1000, or by other data processing systems that have access to the data structures.

In an embodiment of this invention, processor 1030 is a 32-bit microprocessor manufactured by Motorola (e.g., an 680×0 microprocessor) or by Intel (e.g., an 80×86 or Pentium microprocessor). However, any other suitable microprocessor or microcontroller may be utilized. Main memory 1040 is preferably comprised of dynamic random access memory (DRAM). Video memory 1035 is preferably a dual-ported video random access memory. One port of the video memory 1035 is coupled to video amplifier 1055. The video amplifier 1055 is used to drive the display 1060. Video amplifier 1055 is well known in the art and may be implemented by any suitable means. This circuitry converts pixel data stored in video memory 1035 to a raster signal suitable for use by display 1060. Display 1060 is a type of monitor suitable for displaying graphical images.

The computer system described above is depicted for purposes of example only. The present invention may be implemented in any type of computer system or programming or processing environment. It is contemplated that the present invention might be run on a stand-alone computer system, such as the one described above. The present invention might also be run from a server system that can be accessed by a plurality of client computer systems interconnected over an intranet network. Finally, the present invention may be run from a server that is accessible to clients over a wide-area network (WAN) such as the Internet, as is described with regard to FIG. 11.

Many other devices or subsystems (not shown) may be connected in a similar manner (e.g., bar code readers, document scanners, digital cameras and so on). Conversely, it is not necessary for all of the devices shown in FIG. 10 to be present to practice the present invention. The devices and subsystems may be interconnected in different ways from that shown in FIG. 10. The operation of a computer system such as that shown in FIG. 10 is readily known in the art and is not discussed in detail in this application.

Figure 11:
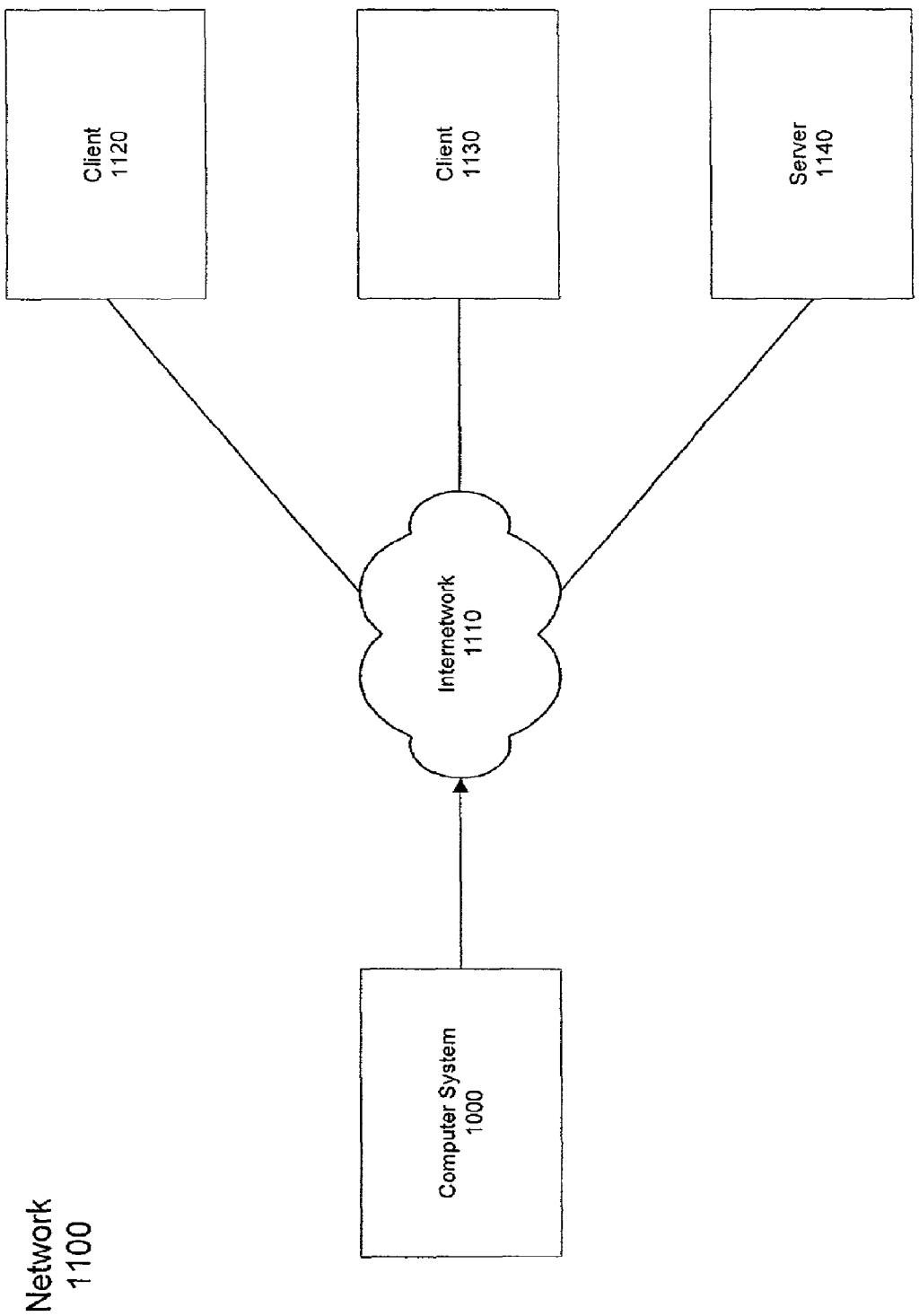
FIG. 11 is a block diagram illustrating the interconnection of the computer system of FIG. 10 to client and host systems.

FIG. 11 is a block diagram depicting a network 1100 in which general-purpose computer 1000 is coupled to an internetwork 1105, which is coupled, in turn, to client systems 1110 and 1120, as well as servers 1130 and 1135. Internetwork 1105 (e.g., the Internet) is also capable of coupling client systems 1110 and 1120, and servers 1130 and 1135 to one another. With reference to general-purpose computer 1000, modem 1047, network interface 1048 or some other method can be used to provide connectivity from general-purpose computer 1000 to internetwork 1105. General-purpose computer 1000, client system 1110 and client system 1120 are able to access information on one or both of servers 1130 and 1135 using, for example, a web browser (not shown). Such a web browser allows general-purpose computer 1000, as well as client systems 1110 and 1120, to access data on servers 1130 and 1135 representing the pages of a website hosted by a respective one of servers 1130 and 1135. Protocols for exchanging data via the Internet are well known to those skilled in the art. Although FIG. 11 depicts the use of the Internet for exchanging data, the present invention is not limited to the Internet or any particular network-based environment.

Referring to FIGS. 10 and 11, a browser running on a computer system (e.g., computer system 1000) can employ a TCP/IP connection to pass a request to a server (e.g., server 1130), which can run an HTTP "service" (e.g., under the WINDOWS® operating system; also referred to herein as an HTTP server) or a "daemon" (e.g., under the UNIX® operating system), for example. Such a request can be processed by contacting such an HTTP server using a protocol that can be used to communicate between the computer and the server (i.e., HTTP). The HTTP server then responds to the protocol, typically by sending a "web page" formatted as an HTML file. The browser interprets the HTML file and may form a visual representation of the same using local resources (e.g., fonts and colors).

Referring again to FIGS. 10 and 11, server 1130 (which includes an HTTP server, as previously noted) can further include a web server (not shown), an application server (also not shown) and a database server operating with an open distributed object computing infrastructure such as Common Object Request Broker Architecture (CORBA) (also not shown). The web server can include a user interface layer and a centralized dispatch mechanism, both of which can be implemented employing Java Server Pages (JSP), for example.

One advantage of employing JSP is that the use of JSP facilitates organization of a website as a state machine. In this manner, the logical organization of a website can be arranged in categories, for example: Controls, States and Transitions. Controls include a Java class of elements that manage the active elements of a page such as render control text or interpret user's action with respect to a page. Examples of controls would be the management of a virtual button on a web page or login management that could include providing a number of dialog boxes containing text and a virtual button. States define a user's current location on the website (e.g., in a state machine), such as the web page that a user is presently viewing. States also define the relationship of a user with respect to a web page being viewed. Transitions define the new state of a user and are a function of a users interaction with a page. Specifically, a transition is defined by the user's current state and the actions taken by the user while in that state (e.g., the result of user operation on a control alters the user's state). Simply put, the user's new state is simply defined as the user's current state, as modified by the transition selected. The transitions are located in a transition module that is responsible for all transitions.

Advantages of the state machine model of the website are that it is has maintainability to facilitate update flow or pages very easily and per user state machine. service different users with maximum code reuse. It is also consistent in that most or all server logic is handled under the same paradigm. Login control, record and display controls cause transitions which update state. Typically, XML/XSL defines the state machine, page content and layout. Such a methodology can also be compatible with the Wireless Application Protocol (WAP). This can extend an existing web site to provide alternative state machines for WAP users.

While particular embodiments of the present invention have been shown and described, it will be obvious to those skilled in the art that, based upon the teaching herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims.

What is claimed is:

1. A method comprising:

performing using a computer system:

receiving a user preference for features of a product; and identifying an inventory item corresponding to the user preference, wherein the inventory item corresponds to a product configuration and the product configuration is defined using a product configuration representation, each entry of said feature map corresponds to a one of a plurality of features of a product, and identifying the inventory item comprises:

accessing the 'product configuration representation', wherein (i) the product configuration representation includes values corresponding to feature options of products in a product line that includes the inventory item, wherein a plurality of the features include multiple feature options so that the product configuration representation includes multiple values for each of the plurality of features that include multiple feature options, and (ii) the values in the product configuration representation represent the inventory item by indicating availability of the feature options in the product associated with the product configuration representation; and mapping the user preference for features of the inventory item using a feature map, wherein (i) the feature map maps feature options of products in the product line to feature options in the product configuration representation, (ii) a user-preference list includes values corresponding to the feature options in the product line and the user preference list represents the received user preference, wherein a plurality of the features include multiple feature options, (iii) the values in the user-preference list map to feature options in the product configuration representation in accordance with the feature map, and (iv) the values in the user-preference list indicate a preference for the features of one or more of the products in the product line.

2. The method of claim 1 wherein each of the values is represented by a value of a bit in a series of bits.

3. The method of claim 1 wherein a position of each bit in the series of bits and a value of the bit correlate to a particular feature option of a particular feature of one of the products.

4. The method of claim 1 wherein the user preference represents one or more communications of user preferences from a user of a client computer system.

5. A method comprising:
performing using a computer system:
storing configurations of products in a product line using respective a 'product configuration representations', wherein (i) each product configuration representation includes values corresponding to feature options of features in a product line associated with the product, wherein a plurality of the features include multiple feature options so that the product configuration representation includes multiple values for each of the plurality of features that include multiple feature options, and (ii) the values in the product configuration representation define a product configuration by indicating availability of the feature options in the product associated with the product configuration representation; and mapping a user preference for features of a product in the product line using a feature map, wherein (i) the feature map maps feature options of products in the product line to features in each of the product configuration representation, (ii) a user-preference list indicating a user preference for features of the product includes values corresponding to the feature options in the product line, wherein a plurality of the features include multiple feature options, (iii) the values in the user-preference list map to feature options in the product configuration representation in accordance with the feature map, and (iv) the values in the user-preference list indicate a preference for the features of one or more of the products in the product line.

6. The method of claim 5 further comprising:
receiving the user preference for features of a product; and
identifying one of the products in the product line corresponding to the user preference for features of the product.

7. The method of claim 5 wherein each of the values is represented by a value of a bit in a series of bits.

8. The method of claim 5 wherein a position of each bit in the series of bits and a value of the bit correlate to a particular feature option of a particular feature of one of the products.

9. A tangible, non-transitory computer readable medium comprising code that is executable by a processor for:
receiving a user preference for features of a product; and
identifying an inventory item corresponding to the user preference, wherein the inventory item corresponds to a product configuration and the product configuration is defined using a product configuration representation, each entry of said feature map corresponds to a one of a plurality of features of a product, and identifying the inventory item comprises:
accessing the 'product configuration representation', wherein (i) the product configuration representation includes values corresponding to feature options of products in a product line that includes the inventory item, wherein a plurality of the features include multiple feature options so that the product configuration representation includes multiple values for each of the plurality of features that include multiple feature options, and (ii) the values in the product configuration representation represent the inventory item by indicating availability of the feature options in the product associated with the product configuration representation; and mapping the user preference for features of the inventory item using a feature map, wherein (i) the feature map maps feature options of products in the product line to feature options in the product configuration representation, (ii) a user-preference list includes values corresponding to the feature options in the product line and the user preference list represents the received user preference, wherein a plurality of the features include multiple feature options, (iii) the values in the user-preference list map to feature options in the product configuration representation in accordance with the feature map, and (iv) the values in the user-preference list indicate a preference for the features of one or more of the products in the product line.

10. The computer readable medium of claim 9 wherein each of the values is represented by a value of a bit in a series of bits.

11. The computer readable medium of claim 9 wherein a position of each bit in the series of bits and a value of the bit correlate to a particular feature option of a particular feature of one of the products.

12. The computer readable medium of claim 9 wherein the user preference represents one or more communications of user preferences from a user of a client computer system.

13. A tangible, non-transitory computer readable medium comprising code that is executable by a processor for:
storing configurations of products in a product line using respective a 'product configuration representations', wherein (i) each product configuration representation includes values corresponding to feature options of features in a product line associated with the product, wherein a plurality of the features include multiple feature options so that the product configuration representation includes multiple values for each of the plurality of features that include multiple feature options, and (ii) the values in the product configuration representation define a product configuration by indicating availability of the feature options in the product associated with the product configuration representation; and mapping a user preference for features of a product in the product line using a feature map, wherein (i) the feature map maps feature options of products in the product line to features in each of the product configuration representation, (ii) a user-preference list indicating a user preference for features of the product includes values corresponding to the feature options in the product line, wherein a plurality of the features include multiple feature options, (iii) the values in the user-preference list map to feature options in the product configuration representation in accordance with the feature map, and (iv) the values in the user-preference list indicate a preference for the features of one or more of the products in the product line.

14. The computer readable medium of claim 13 wherein the code is further executable by the processor for:
   receiving the user preference for features of a product; and
   identifying one of the products in the product line corresponding to the user preference for features of the product.

15. The computer readable medium of claim 13 wherein each of the values is represented by a value of a bit in a series of bits.

16. The computer readable medium of claim 13 wherein a position of each bit in the series of bits and a value of the bit correlate to a particular feature option of a particular feature of one of the products.

17. An apparatus comprising:
   a processor; and
   a memory coupled to the processor, wherein the memory includes code stored therein that is executable by the processor for:
      receiving a user preference for features of a product; and
      identifying an inventory item corresponding to the user preference, wherein the inventory item corresponds to a product configuration and the product configuration is defined using a product configuration representation, each entry of said feature map corresponds to a one of a plurality of features of a product, and identifying the inventory item comprises:
      accessing the 'product configuration representation', wherein (i) the product configuration representation includes values corresponding to feature options of products in a product line that includes the inventory item, wherein a plurality of the features include multiple feature options so that the product configuration representation includes multiple values for each of the plurality of features that include multiple feature options, and (ii) the values in the product configuration representation represent the inventory item by indicating availability of the feature options in the product associated with the product configuration representation; and
      mapping the user preference for features of the inventory item using a feature map, wherein (i) the feature map maps feature options of products in the product line to feature options in the product configuration representation, (ii) a user-preference list includes values corresponding to the feature options in the product line and the user preference list represents the received user preference, wherein a plurality of the features include multiple feature options, (iii) the values in the user-preference list map to feature options in the product configuration representation in accordance with the feature map, and (iv) the values in the user-preference list indicate a preference for the features of one or more of the products in the product line.

18. The apparatus of claim 17 wherein each of the values is represented by a value of a bit in a series of bits.

19. The apparatus of claim 17 wherein a position of each bit in the series of bits and a value of the bit correlate to a particular feature option of a particular feature of one of the products.

20. The apparatus of claim 17 wherein the user preference represents one or more communications of user preferences from a user of a client computer system.

21. An apparatus comprising:
   a processor; and
   a memory coupled to the processor, wherein the memory includes code stored therein that is executable by the processor for:
      storing configurations of products in a product line using respective a 'product configuration representations', wherein (i) each product configuration representation includes values corresponding to feature options of features in a product line associated with the product, wherein a plurality of the features include multiple feature options so that the product configuration representation includes multiple values for each of the plurality of features that include multiple feature options, and (ii) the values in the product configuration representation define a product configuration by indicating availability of the feature options in the product associated with the product configuration representation; and
      mapping a user preference for features of a product in the product line using a feature map, wherein (i) the feature map maps feature options of products in the product line to features in each of the product configuration representation, (ii) a user-preference list indicating a user preference for features of the product includes values corresponding to the feature options in the product line, wherein a plurality of the features include multiple feature options, (iii) the values in the user-preference list map to feature options in the product configuration representation in accordance with the feature map, and (iv) the values in the user-preference list indicate a preference for the features of one or more of the products in the product line.

22. The apparatus of claim 21 wherein the code is further executable by the processor for:
   receiving the user preference for features of a product; and
   identifying one of the products in the product line corresponding to the user preference for features of the product.

23. The apparatus of claim 21 wherein each of the values is represented by a value of a bit in a series of bits.

24. The apparatus of claim 21 wherein a position of each bit in the series of bits and a value of the bit correlate to a particular feature option of a particular feature of one of the products.

* * * * *